Aug. 25, 1931.  O. W. DUTTON  1,820,449
ANTISKID DEVICE
Filed Feb. 25, 1930
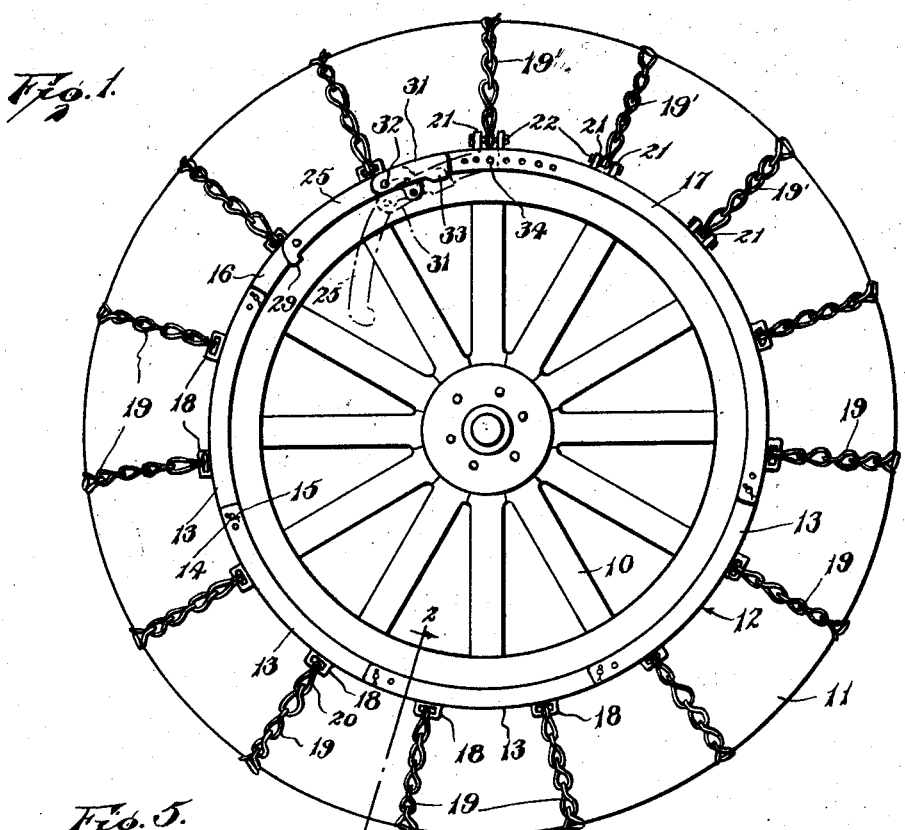
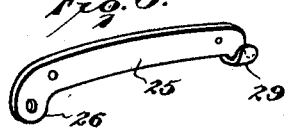
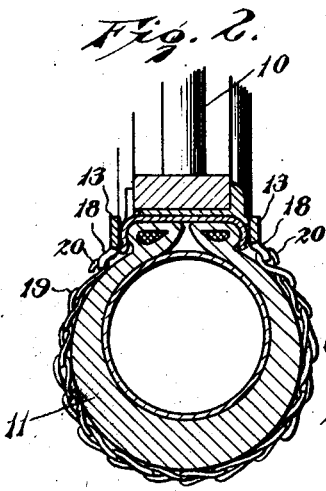
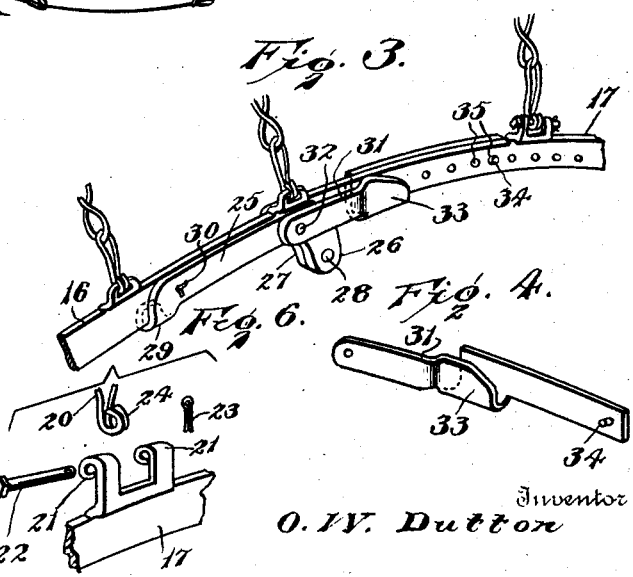
Inventor
O. W. Dutton
By Lacey & Lacey,
Attorney Patented Aug. 25, 1931

1,820,449

UNITED STATES PATENT OFFICE

ORLIE W. DUTTON, OF DODGE CENTER, MINNESOTA, ASSIGNOR OF ONE-HALF TO HAROLD E. THOMAS, OF DODGE CENTER, MINNESOTA

ANTISKID DEVICE

Application filed February 25, 1930. Serial No. 431,222.

This invention relates to anti-skid devices and has for an object to provide an improved construction of side rings comprising pivoted curved bars held in annular form by interlocking means which permits of the device being easily and quickly applied to and detached from a vehicle wheel.

Another object of the invention is to provide an improved construction of locking means for connecting the terminal bars of each ring and holding the ring against accidental opening by centrifugal force or other causes.

A still further object is to provide an anti-skid device which employs in connection with permanent tread chains, a plurality of auxiliary tread chains which are removable from the rings so that the device may be fitted to a vehicle wheel without jacking up the wheel.

With the above and other objects in view the invention consists in certain novel details of construction and combinations of parts hereinafter fully described and claimed it being understood that various modifications may be resorted to within the scope of the appended claims without departing from the spirit or sacrificing any of the advantages of the invention.

In the accompanying drawings forming part of this specification,

Figure 1 is a side elevation of an antiskid device embodying my improvements and showing the locking lever and connecting link dotted in released position.

Figure 2 is a cross-sectional view taken on the line 2—2 of Figure 1,

Figure 3 is a fragmentary perspective view showing the locking device,

Figure 4 is a perspective view of the connecting link,

Figure 5 is a perspective view of the lever, and

Figure 6 is a perspective view showing the parts for removably securing the auxiliary chains.

Referring now to the drawings in which like characters of reference designate similar parts in the various views, 10 designates an automobile wheel which is equipped with a pneumatic tire 11.

The preferred embodiment of my invention comprises side rings 12, each formed of a plurality of curved flat sections or bars 13 pivotally connected together by pivot pins 14. Cotter pins 15 are disposed in the ends of the pivot pins to removably secure the bars together.

The terminal bars 16 and 17 of each ring are connected by locking devices hereinafter described and which hold the pivoted bars in annular form. The bars are equipped with eyes 18 on the outer edges to secure the tread chains 19.

The tread chains 19 terminate in hooks 20 which are engaged in the eyes 18. Each bar of each ring carries preferably a pair of chains with the exception of the terminal bar 17 which, in addition to the permanent pair of chains, carries preferably three removable auxiliary chains designated by the numeral 19'.

When removed the chains 19' leave a gap in the annular series of tread chains. This gap is disposed at the bottom of the wheel so that the anti-skid device may be applied to the wheel without jacking up the wheel. After application of the anti-skid device the auxiliary chains are then secured in position to fill the gap.

As shown in Figure 6, for removably securing the auxiliary chains 19' to the side rings, the terminal bars 17 are equipped with pairs of eyes 21 having pintles 22 removably secured therein by cotter pins 23. Each chain 19' terminates in eyes 24 which receive the pintles 22.

The mechanism for locking the sections of the pivoted bars of each ring in annular form will now be described.

A lever 25 as best shown in Figure 5 is terminally provided with a radially disposed off-set terminal 26 through which and a similar radially disposed off-set portion 27 on the terminal bar 16, a pivot pin 28 is passed. The lever terminates at the grip end in a hook 29 which engages the bar 16 when the lever is closed and prevents dislodgment of the lever due to centrifugal force or other causes. A cotter pin 30 may be passed through the lever and through the bar 16 as an additional securing means, if desired.

A connecting link 31, as best shown in Figure 4, is pivoted at one end to the lever 25 by means of a pivot pin 32. The link is centrally provided with a loop 33 which embraces the end of the terminal bar 17 and performs the same function as the hook on the lever, namely, it prevents, dislodgment of the link due to centrifugal force or other causes. The link is provided with a laterally disposed lug 34 which is selectively engageable in any one of a series of openings 35 formed in said terminal bar 17.

As shown in dotted lines in Figure 1, the lever may be rocked inwardly towards the hub of the wheel to disengage the loop 33 of the link from the bar 17. Continued movement of the lever moves the pivoted end of the link below the fulcrumed end of the lever and in this position of the parts, the lug 34 may be dislodged from the opening 35. This frees the terminal bars 16 and 17 of the ring and permits the ring to be opened and removed from the wheel.

In operation, the three auxiliary tread chains 19' are removed. The anti-skid device is then applied to the wheel by positioning the side rings so that the gap left by the removed tread chains 19' is at the bottom of the wheel. The lugs 34 of the connecting links may now be engaged in selected openings in the terminal bars 17. The levers 25 are now rocked closed to cause the loops 33 in the links to embrace the terminal bars 17 and the hooks 29 of the levers 25 to embrace the terminal bars 16. The cotter pins 30 may now be applied if desired although for ordinary conditions of service these cotter pins are unnecessary. The vehicle may now be started to position the gaps in the annular series of tread chains near the top of the wheel. The auxiliary chains 19' are now secured in place. To detach the anti-skid device the above described operations are reversed.

If desired the auxiliary chains 19' may be left off since there is a sufficient number of cross chains 19 to prevent the tire chains from dropping off. The auxiliary chains may thus be replaced when the tire chains are removed, or at any other convenient time, to maintain the tire chains assembled as a unit.

It will be furthermore noted that the bar 17 overlaps the bar 16 when the lever is closed so that the connecting link 31 is reinforced to resist lateral strain.

Having thus described the invention, I claim:

1. Means for locking bars together, comprising a lever terminally pivoted to one of said bars, a connecting link pivoted to said lever between the grip and the pivot thereof, and a loop substantially midway between the ends of said link engageable with the other of said bars.

2. Means for locking bars together, comprising a lever fulcrumed on the end of one of said bars, there being a plurality of openings formed in the end of another of said bars, and a link pivoted at one end to said lever and having a lateral lug on the other end selectively engageable in said openings, said link having a loop intermediate the ends receiving the last-named bar between said lever and said lug.

3. Interlocking means between bars comprising a connecting link having a lug at one end and selectively engageable in a series of openings in one of said bars and having a loop intermediate the ends embracing the end of said bar, the other of said bars having an offset end, and a lever pivoted to said offset end and pivoted to said connecting link, said lever having a grip terminating in a hook embracing the last-named bar.

In testimony whereof I affix my signature.

ORLIE W. DUTTON. [L. S.]